United States Patent [19]

Eolkins

[11] Patent Number: 4,951,071

[45] Date of Patent: Aug. 21, 1990

[54] RESISTIVE NIB IONOGRAPHIC IMAGING HEAD

[75] Inventor: Jeffrey J. Eolkins, Rochester, N.Y.

[73] Assignee: Xerox Corporation, Stamford, Conn.

[21] Appl. No.: 426,368

[22] Filed: Oct. 25, 1989

[51] Int. Cl.[5] .............................................. G01D 15/06

[52] U.S. Cl. ...................................................... 346/159

[58] Field of Search ............................... 346/159, 153.1

[56] References Cited

U.S. PATENT DOCUMENTS

| | | | |
|---|---|---|---|
| 4,430,661 | 2/1984 | Tarumi et al. | 346/153.1 |
| 4,463,363 | 7/1984 | Gundlach et al. | 346/159 |
| 4,524,371 | 6/1985 | Sheridon et al. | 346/159 |
| 4,538,163 | 8/1985 | Sheridon | 346/155 |
| 4,593,994 | 6/1986 | Tamura et al. | 355/3 S C |
| 4,644,373 | 2/1987 | Sheridan et al. | 346/159 |
| 4,737,805 | 4/1988 | Weisfield et al. | 346/159 |
| 4,763,141 | 8/1988 | Gundlach et al. | 346/158 |

*Primary Examiner*—Donald A. Griffin
*Attorney, Agent, or Firm*—Mark Costello

[57] ABSTRACT

In an ionographic device including an imaging head projecting a modulated stream of ions in imagewise fashion towards a moving imaging surface, wherein the head is provided with an ion chamber supporting a coronode held at a voltage $V_C$ to produce ions for deposit on an imaging surface and an ion chamber exit forming a modulation channel extending from the ion chamber towards the imaging surface through which a stream of ions are directed for imagewise modulation by a plurality of modulation electrodes, electric field distribution through the modulation channel is controlled by forming the modulation electrodes with resistive material. When a individual resistive material nib is turned on, a voltage difference is applied across the electrode in the ion flow direction, to shape the electric field through the modulation channel so that it is closely parallel to the surface of the electrode. Ions thus tend to flow in the direction of the electric field, though the modulation channel. The invention has application to both fluid jet assisted devices and non-fluid jet assisted devices.

24 Claims, 7 Drawing Sheets

RESISTIVE NIB IONOGRAPHIC IMAGING HEAD

The present invention relates generally to ionographic imaging devices, and more particularly to ionographic imaging devices which control ion projection by shaped projection fields.

INCORPORATION BY REFERENCE

U.S. Pat. No. 4,524,371 to Sheridon et al., U.S. Pat. No. 4,463,363 to Gundlach et al., U.S. Pat. No. 4,538,163 to Sheridon, U.S. Pat. No. 4,763,141 to Gundlach et al, U.S. Pat. No. 4,644,373 to Sheridan et al., U.S. Pat. No. 4,737,805 to Weisfield et al.

BACKGROUND OF THE INVENTION

In ionographic devices such as that described by U.S. Pat. No. 4,524,371 to Sheridon et al. or U.S. Pat. No. 4,463,363 to Gundlach et al., an ion producing device generates ions to be directed past a plurality of modulation electrodes to an imaging surface in imagewise configuration. In one class of ionographic devices, ions are produced at a coronode supported within an ion chamber in an imaging head, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on a charge retentive surface in imagewise configuration to form an electrostatic latent image developable by electrostatographic techniques for subsequent transfer to a final substrate. The arrangement produces a high resolution non-contact printing system. Other ionographic devices operate similarly, but do not rely on a moving fluid stream to carry ions to a surface, such as U.S. Pat. No. 4,763,141 to Gundlach et al. Some such devices provide low amounts of airflow for the purpose of removal of corona effluents.

Corona efficiency in ionographic heads is very low, on the order of 0.1% to 0.5%, when efficiency is defined as the ratio of the current reaching the electroreceptor to the total current within the corona chamber. The low efficiency limits the amount of charge that can be deposited on an imaging surface over a given period. Thus, in high speed devices, the development process is compromised because the development charge is relatively low, in comparison to other electrostatographic processes. One cause of this low efficiency is that the electric fields within the imaging head are not optimized to direct ions out of the ion chamber, so that ions instead contact conductive surfaces within the head where the ions neutralize into uncharged, or neutral air molecules. This can be partially overcome by increasing fluid flow velocity through the head to entrain ions within the fluid stream and carry the ions out of the head therein. One limitation on this method of improving corona efficiency is the increasing machine noise accompanying increased fluid flow. Dirt management and the high cost of the larger capacity air flow device are other problems. It would be more desirable to change the electric field shapes within the head, and particularly at the ion chamber exit, to direct a greater proportion of ions out of the head, without a requirement for a fluid jet, or enhancing the action of a fluid jet.

U.S. Pat. No. 4,593,994 to Tamura et al. discloses an ion flow modulator for use in a photocopying machine, including a common electrode formed on one major surface of an insulating substrate and a plurality of ion control electrodes formed on the other major surface of the insulating substrate.

SUMMARY OF THE INVENTION

In accordance with the invention, in an ionographic head, there is provided a method and apparatus for controlling electric field distribution though the ion chamber exit, to improve the flow path of the stream of ions therethrough.

In accordance with one aspect of the invention, an ionographic device includes an imaging head projecting a modulated stream of ions in imagewise fashion towards a moving imaging surface, wherein the head is provided with an ion chamber within which is supported a coronode held at a voltage $V_C$ to produce ions for deposit on an imaging surface and an ion chamber exit forming a modulation channel defined by a pair of parallel surfaces extending from the ion chamber towards the imaging surface, through which a stream of ions are directed for imagewise modulation by a plurality of modulation electrodes on one of the parallel surfaces defining the modulation channel. The electric field distribution through the modulation channel (i.e., past the electrodes) is controlled by forming the modulation electrodes with resistive material. When an individual resistive material nib is turned on, a voltage difference is applied across the electrode, in the general direction of ion travel, to create what amounts to an array of voltage drops across the channel, thereby altering and shaping the electric field through the modulation channel. Ions tend to flow in the direction of the electric field, through the modulation channel. The invention has application to both fluid jet assisted devices and non-fluid jet assisted devices.

In accordance with another aspect of the invention, in an alternative arrangement, the modulation channel may be defined by two surfaces, the first surface supporting modulation electrodes, as described, and the second surface provided with a resistive material layer, biased to create an electric field parallel to the second surface, or alternatively, with a second complementary set of modulation electrodes, operated in conjunction with the first set of modulation electrodes to create an electric field having a desirable contour with respect to both first and second surfaces when ion passage is required, and to block the channel when ion passage is not required.

In accordance with yet another aspect of the invention, an ionographic device includes an imaging head projecting a modulated stream of ions in imagewise fashion towards a moving imaging surface, wherein the head is provided with an ion chamber within which is supported a coronode held at a voltage $V_C$ to produce ions for deposit on an imaging surface. The head is provided with a generally linear array or arrays of apertures, through the head wall, extending from the ion chamber towards the imaging surface, each aperture corresponding to an addressable position on the imaging surface, through which a stream of ions is directed for imagewise modulation. A pair of modulation electrodes is associated with each aperture located on the interior (chamber side) and the exterior (imaging surface side) surfaces of the head. Modulation through the aperture is controlled by imagewise variation of the voltage differential between the two modulation electrodes to selectively allow ions to pass through the aperture. A resistive material layer is arranged connecting the two modulation electrodes and covering the interior surface of the aperture, extending through the aperture. The electric field distribution through the aperture is controlled by the voltage applied across the resistive material layer, to shape the electric field through the aperture, for improved efficiency. Ions tend to flow in the direction of the electric field through the aperture.

Conductive modulation electrodes can be modeled by a uniform voltage drop across the modulation channel, extending through the channel. "Writing" of a selected spot is accomplished by connecting a modulation electrode to a reference potential source, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. In combination with the flow of air in a fluid jet assisted device, ions are carried through the modulation channel, in a direction approximately equal to the sum of the force vectors due to the electric field on the ions as they enter the modulation channel and the airstream. Conversely, no "writing" will be effected when the modulation voltage is applied to an electrode. In the present invention it is proposed that the electric field through the modulation channel be varied, by having a voltage gradient through the channel, along the modulation electrode. The field strength is greatest where the voltage drop is greatest.

These and other aspects of the invention will become apparent from the following description used to illustrate a preferred embodiment of the invention read in conjunction with the accompanying drawings in which:

FIG. 1 schematically shows an ionographic imaging head of the type contemplated for use with the present invention, in printing relationship with an imaging surface;

Figure 1:
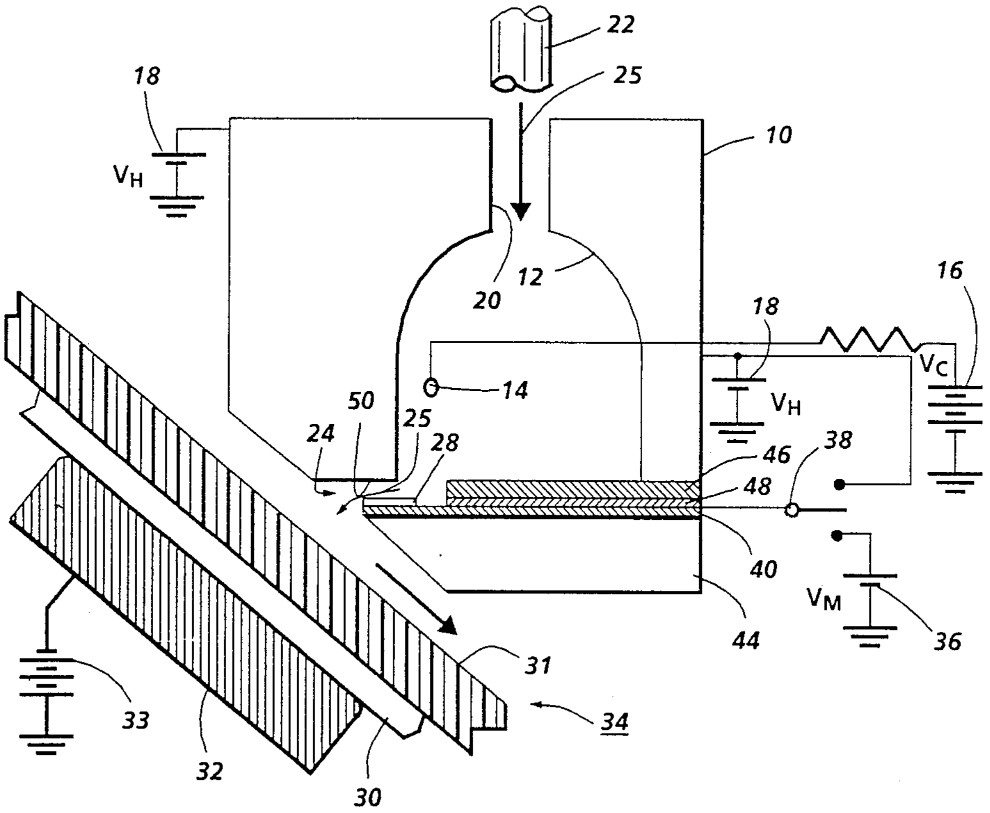

With reference now to the drawings where the showings are for the purpose of illustrating an embodiment of the invention and not for limiting same, FIG. 1 shows a schematic representation of a cross section of the marking head 10 of a fluid jet assisted ionographic marking apparatus similar to that described in commonly assigned U.S. Pat. No. 4,644,373 to Sheridan et al.

Within head 10 is an ion generation region including an ion chamber 12, a coronode 14 supported within the chamber, a high potential source 16, on the order of several thousand volts D.C., applied to the coronode 14, and a reference potential source 18, connected to the wall of chamber 12, maintaining the head at a voltage $V_H$. The corona discharge around coronode 14 creates a source of ions of a given polarity (preferably positive), which are attracted to the chamber wall held at $V_H$, and fill the chamber with a space charge.

An inlet channel 20 to ion chamber 12 delivers pressurized transport fluid (preferably air) into chamber 12 from a suitable source, schematically illustrated by tube 22. A modulation channel 24 conducts the transport fluid out of the chamber from ion chamber 12 to the exterior of the head 10. As the transport fluid passes through ion chamber 12, it entrains ions and moves them into modulation channel 24, past modulation electrodes 28. The interior of ion chamber 12 may be provided with a coating that is inert to the highly corrosive corona byproducts produced therein. Arrows 25 indicate the flow of air through the chamber and modulation channel to the imaging surface.

Ions allowed to pass out of head 10, through modulation channel 24, and directed to charge receptor 34, come under the influence of a reference potential plane 30, provided as a backing layer to a charge receptor dielectric surface 31, with reference potential plane 30 slidingly connected via a shoe 32 to a voltage supply 33. Alternatively, a single layer dielectric charge receptor might be provided, passing a biased back electrode to the same effect. Subsequently the latent image charge pattern may be made visible by suitable development apparatus (not shown).

Once ions have been swept into modulation channel 24 by the transport fluid, it becomes necessary to render the ion-laden fluid stream intelligible. This is accomplished by individually switching modulation electrodes 28 in modulation channel 24, between a marking voltage source 36 held at $V_M$ and reference potential 18 held at $V_H$ by means of a switch 38. While the switching arrangement shown produces a binary imaging function, grey levels may be provided by providing a continuously variable voltage signal to the modulation electrodes. The modulation electrodes are arranged on a thin film layer 40 supported on a planar insulating substrate 44 between the substrate and a conductive plate 46, and insulated from the conductive plate by an insulating layer 48.

Modulation electrodes 28 and the opposite wall 50, held at $V_H$, comprise a capacitor, across which the voltage potential of source 36 may be applied when connected through switch 38. Thus, an electric field, extending in a direction transverse to the direction of the transport fluid flow, is selectively established between a given modulation electrode 28 and the opposite wall 50 to allow or block the flow of ions therepast.

In a standard configuration, as taught by U.S. Pat. No. 4,644,373 to Sheridan et al., "writing" of a selected spot is accomplished by connecting a modulation electrode to the potential source 37, held at $V_H$, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. In combination with the flow of air in a fluid jet assisted device, ions are carried through the modulation channel, in a direction approximately equal to the sum of the force vectors due to the electric field and the airstream. Conversely, no "writing" will be effected when the voltage $V_M$ at voltage source 36 is applied to an electrode. This is accomplished by connecting the modulation electrode 28 to the voltage potential of source 36 via switch 38 so as to impose upon the electrode a charge of the same sign as the ionic species. The ion "beam" will be repelled and be driven into contact with the opposite, conductive wall 50 where the ions neutralize into uncharged, or neutral air molecules. Thus, an imagewise pattern of information is formed by selectively controlling each of the modulation electrodes on the marking array so that the ion "beams" associated therewith either exit or are inhibited from exiting the housing, as desired. For simplicity and economy of fabrication over the large area, full pagewidth head, thin film techniques are used. Thin film silicon, in either the amorphous, polycrystalline or microcrystalline forms, has been the material of choice for the active devices. It is a desirable, although not a required feature of the described arrangement that the control electrodes and connections to $V_M$ are located in a common plane.

As an alternative to an ionographic printing head with fluid jet assisted ion flow, it will no doubt be appreciated that other ionographic print heads may be provided where the ion stream could be field directed to the charge receptor, as will be further elaborated. Further, while the description herein assumes positive ions, appropriate polarity changes may be made so that negative ions may be used.

Figure 2A:
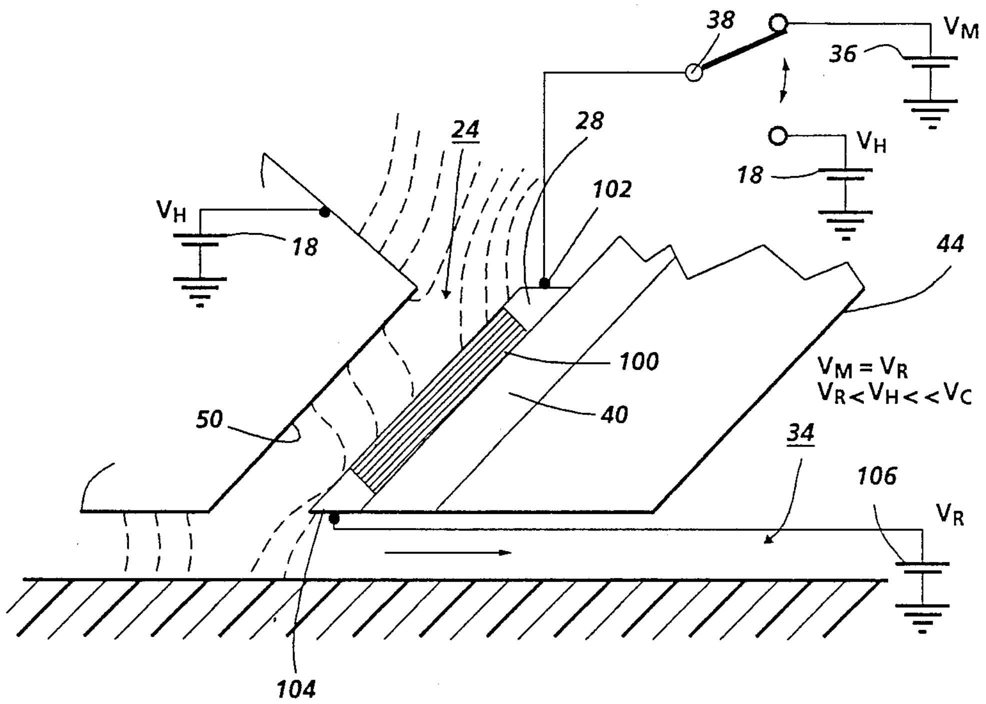
FIGS. 2A and 2B show an embodiment of the invention in the imaging head of FIG. 1.
Figure 2B:
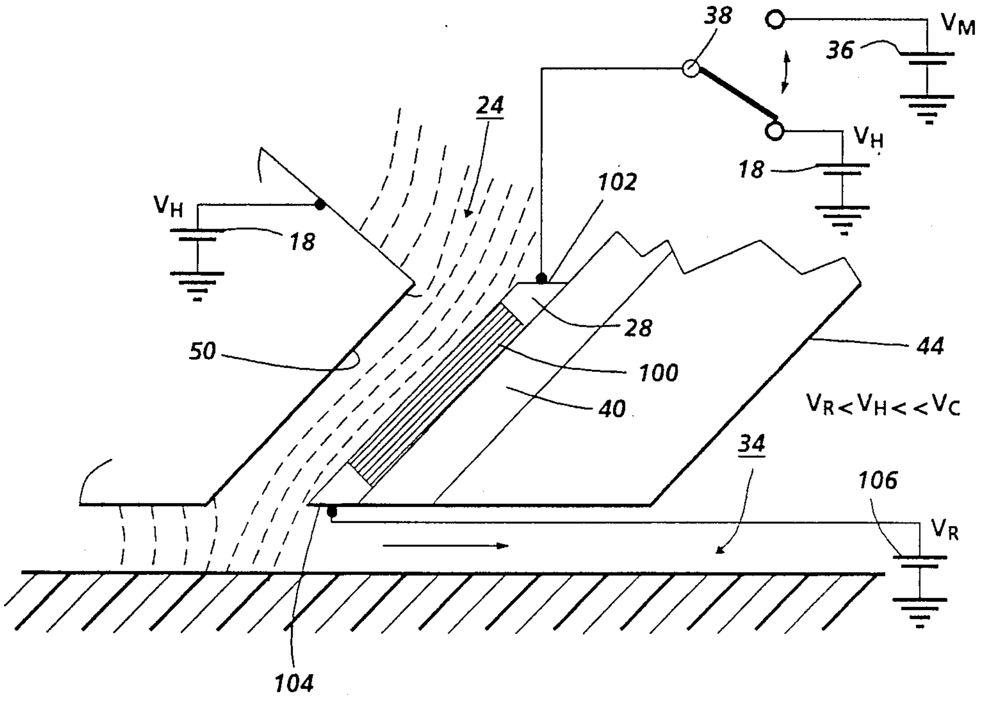

In accordance with the invention, FIGS. 2A and 2B show an enlarged cross sectional view of the modulation channel of the ionographic imaging head 10 of FIG. 1, wherein at least a portion of control electrode 28 extending through modulation channel 24 along thin film layer 40 supported on a planar insulating substrate 44 includes a resistive material segment 100. In the described embodiment, resistive material segment 100 is preferably a thin film deposited on the thin film layer 40 as by sputtering methods or the like, desirably in the same process as the remainder of the control circuit is fabricated. However, the resistive material layer may be a thin or thick film deposited on a substrate in a variety of methods. Conductive contacts 102 and 104 may be provided, connecting resistive material segment 100 respectively to switch 38 and power supply 106, held at reference voltage source $V_R$, selected to provide an appropriate electric field configuration at the outlet end of the modulation channel. In at least one possible arrangement, $V_R$ may be equal to $V_H$. However, as will become apparent, it is not necessary for $V_R$ to be equal to $V_H$, and advantages may lie in careful selection of $V_R$ with respect to $V_H$. In the drawing shown, $V_R < V_H << V_C$. In FIG. 2A, switch 38 connects control electrode 28 to $V_M$, a position blocking passage of the electrons to charge receptor 34. With $V_M = V_R$, and $V_H$ greater than $V_R$, the voltage difference between conductive wall 50 and control electrode 28 produces an electric field, indicated by the dotted lines through modulation channel 24, that blocks the flow of ions therethrough.

As shown in FIG. 2B, when the resistive material electrode is connected to $V_H$, (the writing position) the electric field, indicated by the dotted lines through the modulation channel 24 tends to take a shape generally parallel to the resistive material segment, due to the voltage drop therealong. By providing such a shaped electric field, ions follow the electric field through the modulation channel. Efficiency is increased as a greater portion of ions follow the field, rather than be driven into contact with conductive wall 50 where the ions neutralize into uncharged, or neutral air molecules.

Resistivity and thickness of the resistive control electrode are selected as follows. The highest resistance is determined by problems with ion currents entering the modulation channel, hitting the resistive material layer, joining with the nominal current through the resistive material electrode and affecting the voltage drop across the nib in a manner which changes its control characteristics. For example, if the tunnel current from the ion source is $I_0$, and if all of this current is absorbed into the resistive material electrode in some mode, then the voltage drop across the resistive material electrode could change by $I_0 \times$ resistance-cm. Thus, given an ion current of 100 na/cm, for a modulation channel 0.005" long (0.0125 cm) and a resistive material of $10^{11}$ ohms/-square, it can be seen that 100 na/cm$\times 10^{11}$ ohms/-square$\times$0.0125 cm$=$125 *V*, a voltage potential much higher than that normally used to drive the control electrodes, although such high potentials may have use in high corona current devices. In actual practice the current to the electrodes may exceed the head output current by a large amount. Also, at different process speeds and receiver charge densities the head current can vary up by 1 or 2 orders of magnitude. Therefore, a resistivity significantly higher than $10^{10}$ or $10^{11}$ is not deemed desirable, although in some configurations higher values might be used.

Another consideration in structuring the resistive material electrode is the resistive layer thickness. If the material resistivity is too high and an attempt to lower the resistivity is made by making the layer thicker, there will be a voltage drop across the thickness of the layer which will also give undesirable results. Clearly the layer should be significantly (orders of magnitude) thinner than the length.

The lowest useful resistance is determined by the power sourcing capability of $V_M$ or resistive heating considerations. If the resistance is too low, the drive electronics will be "loaded down" and will not be able to supply the proper voltage drop across the resistive layer. For example, if an an ion driver circuit arrangement is capable of supplying approximately 1 $\mu$A per pixel electrode at about 60 V, it is implied that nib resistance could be no less than $6*10^7$ ohms, and if the nib dimensions were, for example, 0.0085 cm (for a 300 spi device) by 0.0125 cm (modulation channel length), then the resistivity of the resistive material layer could be no less than 40 megaohms per square. Of course, both upper and lower resistivity values may vary with current output and shapes of the control electrodes. Accordingly, while not intending to be limiting, it is believed that a desirable range of values of the resistivity of the resistive material will be in the range of about $10^6$ to about $10^{11}$ ohms per square.

Fabrication of the inventive resistive electrodes may be from doped amorphous silicon.

Figure 3:
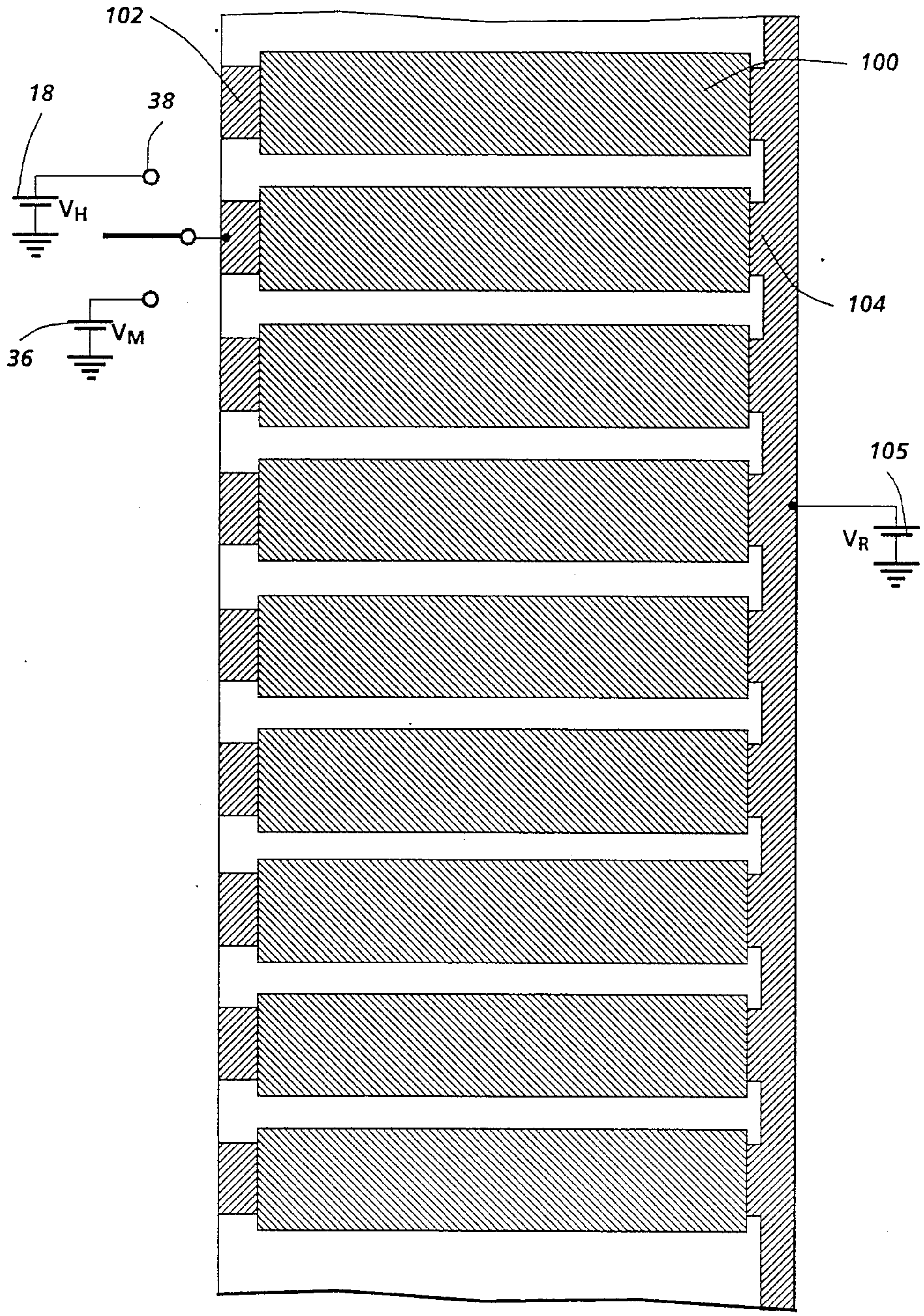
FIG. 3 shows a partial plan view of the invention described in FIGS. 2A and 2B.

FIG. 3 shows a cutaway plan view of the array of control electrodes 28 which demonstrates the use of the resistive material segment in place of a standard conductive material. As shown, the resistive material segment 100 is arranged between contacts 102 switched between $V_M$ and $V_R$, and contact 104, closest to the imaging surface, at $V_R$ in the embodiment shown. Thus, there is a voltage drop across the resistive material segment 100 of $V_M - V_R$. For simplicity, the schematic switching arrangement for only one nib is shown in FIG. 3, although in an actual device, every nib would be connected to an individually controlled switch.

Figure 4A:
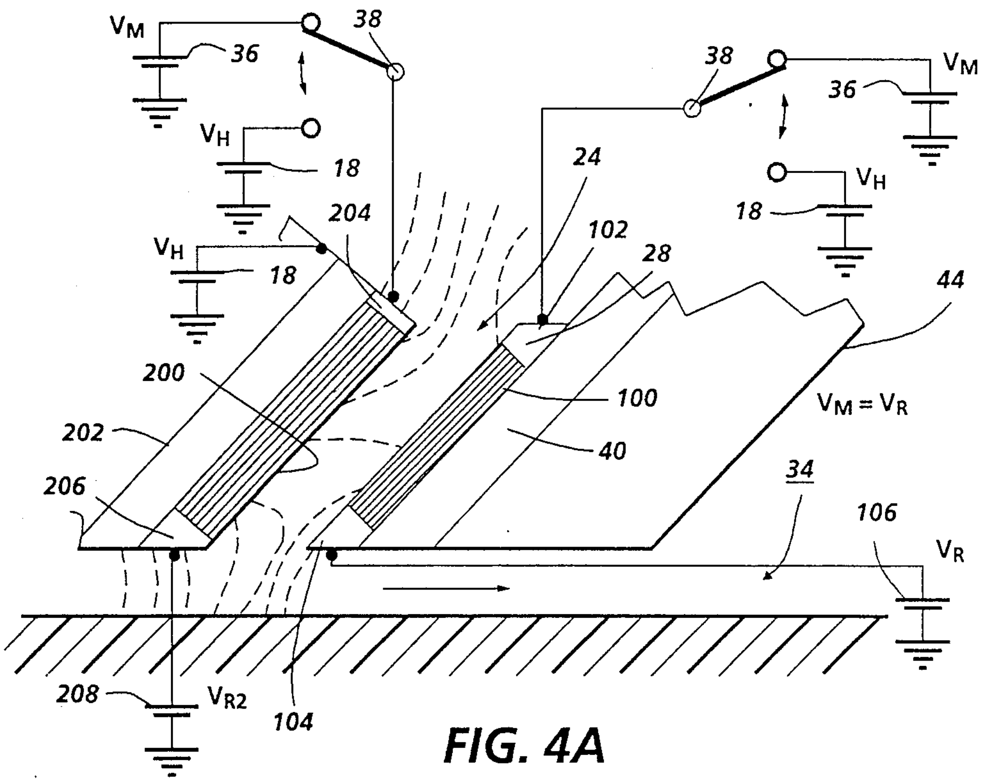
FIGS. 4A and 4B show another embodiment of the invention.
Figure 4B:
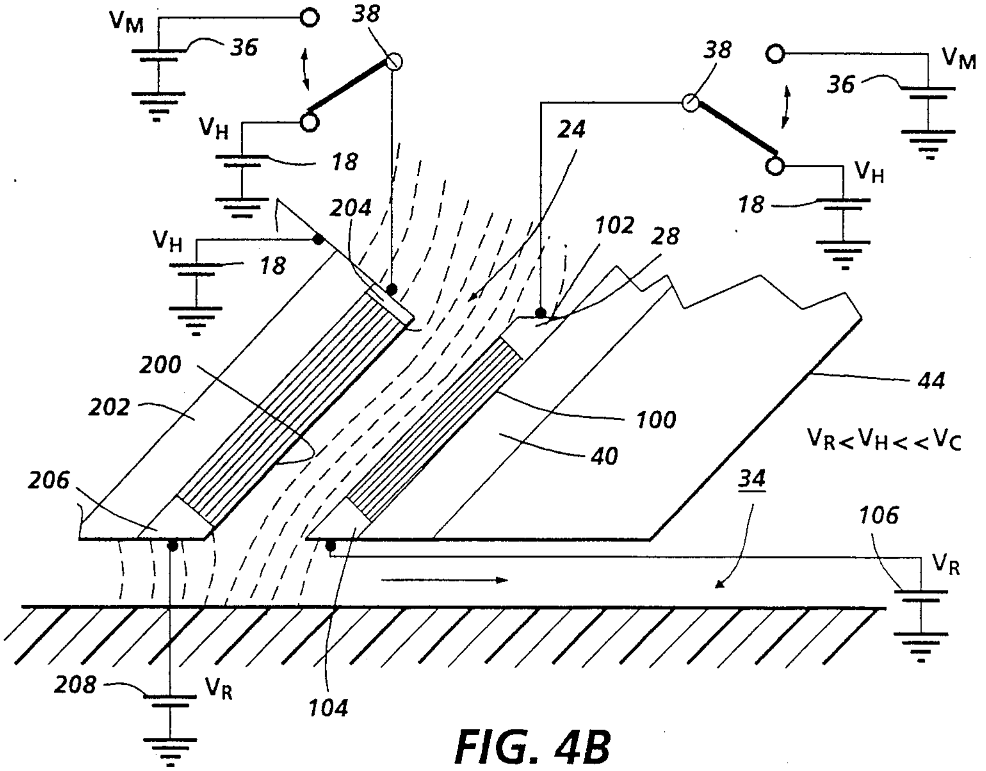

While manufacturing difficulties may require that only one surface of the modulation channel be provided with a resistive material covering, it will no doubt be appreciated that if both surfaces of the modulation channel could be covered with such a resistive material layer, advantageous results would be obtained, primarily because of the greater control afforded to shaping the electric field. Accordingly, and with reference to FIGS. 4A and 4B, the head previously described with respect to FIGS. 1–3 is shown with the addition of a complementary set of resistive material electrodes 200 driven in a fashion complementary to the electrode 28, supported on an insulating substrate 202, and connected via contacts 204 and 206 to marking switch 38 and reference voltage source 208, held at $V_{R2}$, respectively. In this case, the second set of resistive material electrodes 500 may be connected or otherwise driven similarly to resistive material electrodes 28. Of course, it may be determined that the second set of electrodes may be driven with similar control signals to the first set of electrodes, but at different magnitudes or polarities. $V_{R2}$ may be a voltage selected to provide a desired voltage drop across electrode 200, and may be equal to $V_R$, but also may be selected as another value that may desirably shape the field at the exit of the modulation channel.

It will no doubt be appreciated that the second surface of the modulation channel could be covered with a resistive material layer uniformly across face 50, insulated from head 10, and driven with a single voltage drop to similar advantage. Alternatively, it may be desirable to provide across face 50, an array of resistive material elements of a smaller or larger number than the array of marking electrodes, and driven either with constant voltages or switched voltages, as described for FIGS. 4A and 4B.

Figure 5:
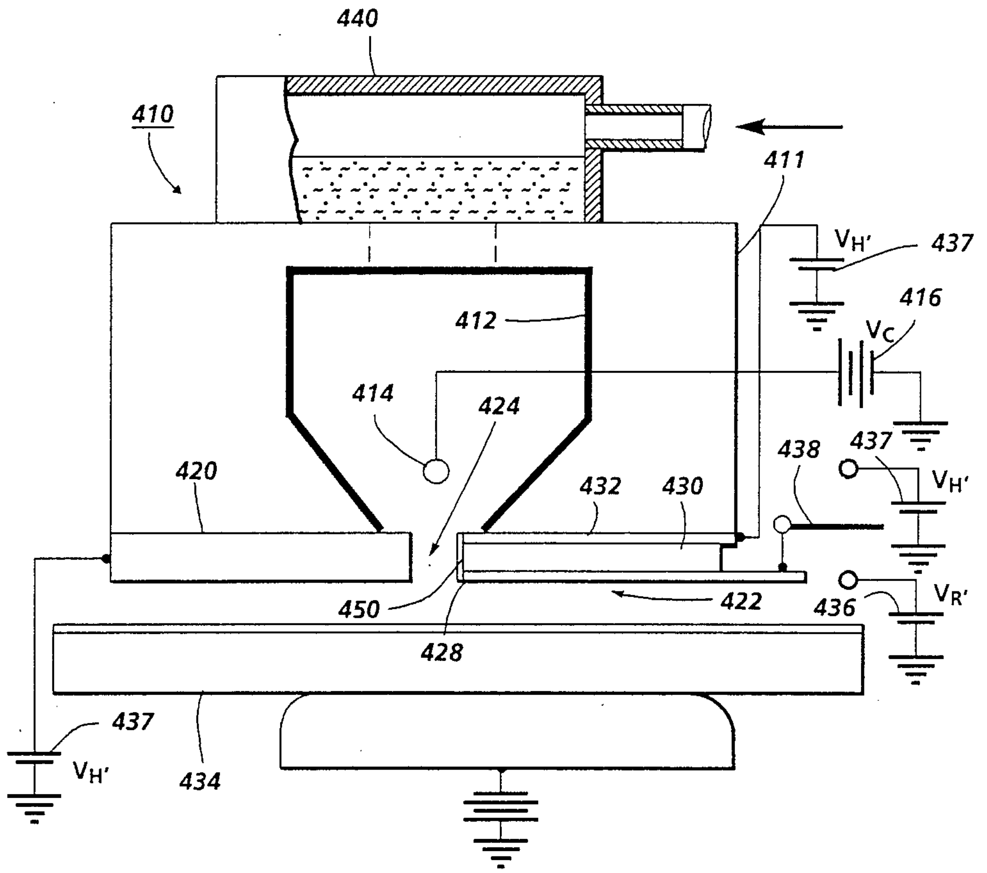
FIG. 5 shows a non-fluid jet assisted imaging head configuration.

FIGS. 1–4 shows a fluid jet assisted ion imaging head. FIGS. 5 and 6 show a non-fluid jet assisted ion imaging head similar to that described in U.S. Pat. No. 4,763,141 to Gundlach et al. Head 410 includes a body 411 having an ion generation region including an ion chamber 412, a coronode 414 supported within the chamber, and a high potential source 416 supplying a voltage $V_C$, on the order of several thousand volts D.C., applied to coronode 414. Body 411 defines the shape of ion chamber 412 with an insulating material such as plexiglass. Conductive solid electrode 420 and sandwich electrode 422 are attached by conventional means to the bottom of the body 411 and together define a modulation channel 424 through which ions from coronode 414 are emitted and directed towards the imaging surface 434. Corona discharge around coronode 414 creates a source of ions which are attracted to conductive solid electrode 420 and sandwich electrode 422, and directed thereto at least partially by the shape of ion chamber 412, the walls of which acquire a charge and corresponding voltage to create an electric field tending to cause ions to move towards modulation channel 424. Conductive solid electrode 416 has a face co-extensive and parallel with modulation channel 424. Sandwich electrode 422 includes an array of addressable electrodes 428 arranged in an array on the bottom of insulator 430, and an upper conductor 432. Electrodes 428 may be fashioned on a thin insulating substrate (such as Kapton) having a thin conductive layer on top and bottom surfaces. The addressable electrodes are individually controlled in a conventional manner by applying a bias between marking voltage $V_{R'}$ and reference voltage $V_{H'}$, respectively provided by power supplies 436 and 437 via a switch 438 that is switched between marking voltage $V_{R'}$ and reference voltage $V_{H'}$, respectively provided by power supplies where $V_{R'} \neq V_{H'}$. A significant flow of air through body 411 is produced by corona winds induced by the coronode. These winds may aid removal of corona effluents produced as a byproduct of corona production. Accordingly, to enhance air flow through body 411, a filtering inlet arrangement 440 may be provided to filter air entering the body.

Figure 6A:
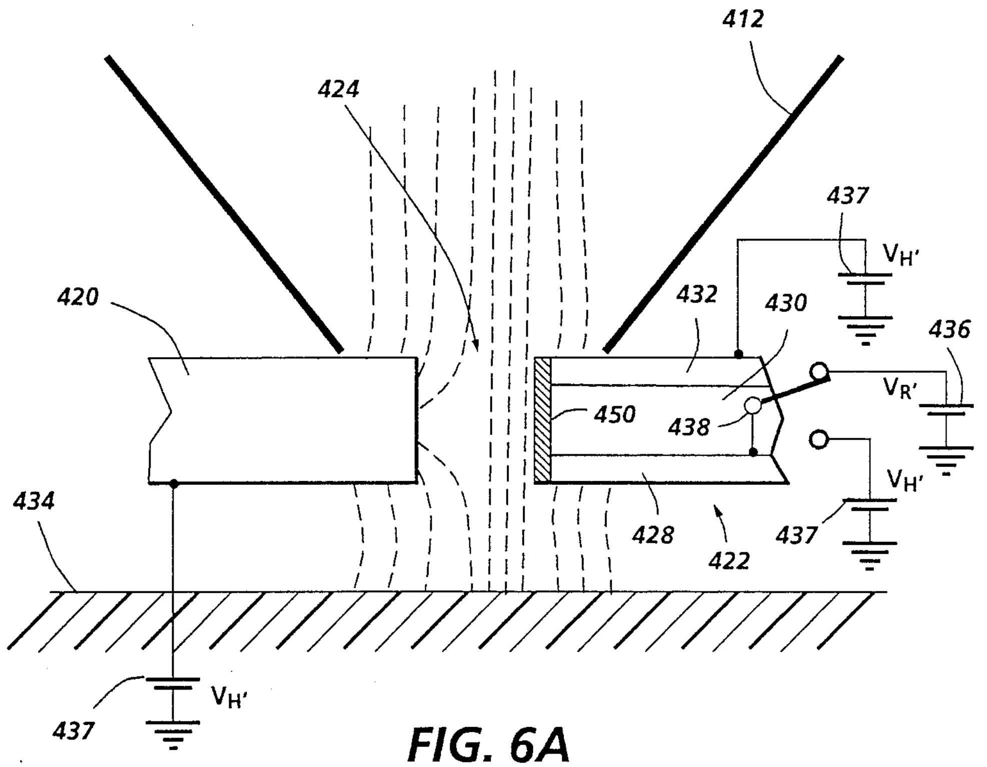
FIGS. 6A and 6B show another embodiment of the invention in a non-fluid jet assisted imaging head configuration.
Figure 6B:
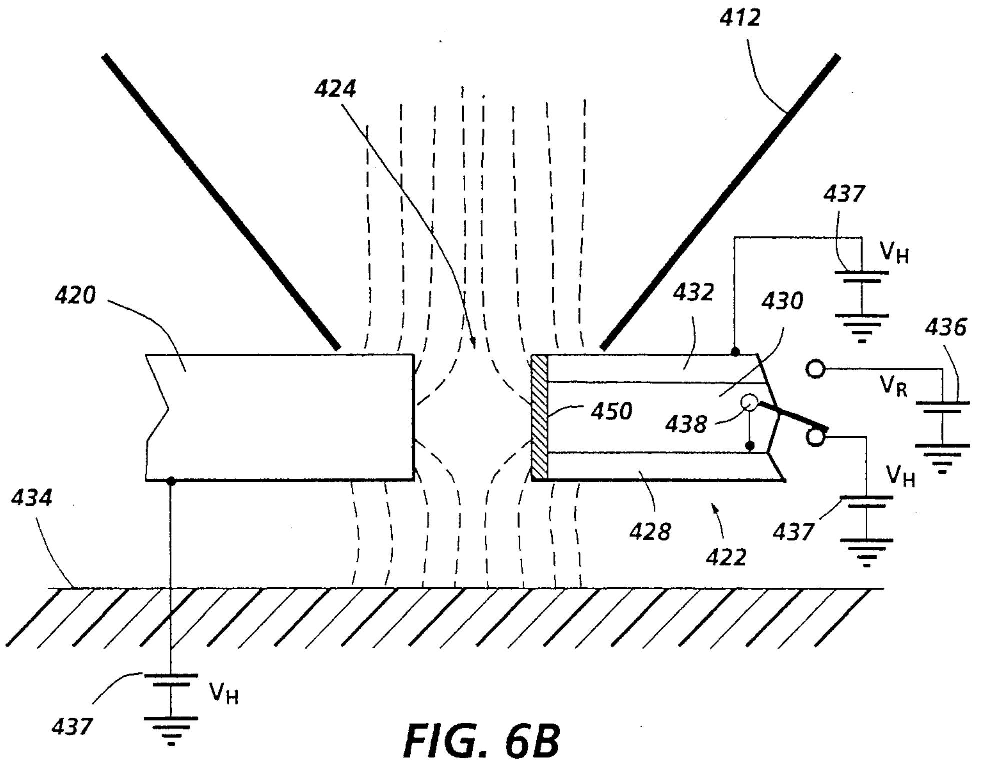

With reference to FIGS. 6A and 6B, an enlarged view of the modulation channel 428 of body 411 is shown. Conductive solid electrode 420 has a face co-extensive and parallel with modulation channel 424. Sandwich electrode 422 includes addressable electrodes 428 arranged in a linear array on the bottom of insulator 430. Covering the exposed face of insulator 430, parallel to the modulation channel 428, resistive material segments 450 extend over the insulator, each segment connected between electrodes 428 and upper conductor 432. Upper conductor 432 is, in turn, connected to a voltage source 437 held at $V_{H'}$, a voltage appropriate to create the desired voltage drop across the resistive material layer. By covering the face of the insulator, no charge buildup occurs on the exposed face thereof, which tends to create undesirable electric field in the direction transverse to the desired ion flow direction. With the resistive material segment 450 having a voltage gradient created thereacross in the direction of desired ion flow, the electric field through the ion generation is provided closely parallel to the surfaces defining the modulation channel. In this arrangement, without the resistive material layer, the exposed face of insulator 430 will tend to acquire a charge, which will unpredictably affect the electric field configuration through the modulation channel. FIG. 6A shows the head in a writing condition with a voltage gradient across resistive material segment 450. Because of the voltage gradient created across the resistive material segment, the electric field (shown in dashed lines) tends to extend parallel to the face of the sandwich electrode 422. Ions following the field lines travel through the modulation channel 424 to reach charge receptor 434. FIG. 6B shows the head in a non-writing condition with no voltage gradient across resistive material segment 450. Without a voltage gradient, the electric field (shown in dashed lines) tends to terminate at the face of the sandwich electrode 422. Ions following the field lines are absorbed at the faces of electrodes 420 and 422 and fail to reach charge receptor 434.

Resistive material could cover the entire exposed face of insulator 430. While there may be some crosstalk between the adjacent writing positions, generally the relatively high resistance of the resistive material layer would serve to isolate the writing positions. It will also be appreciated that the embodiments of FIGS. 4A and 4B have equal application to the embodiments of FIGS. 5, 6A and 6B, so that both faces of the modulation channel could have an array of resistive material electrodes.

Figure 7A:
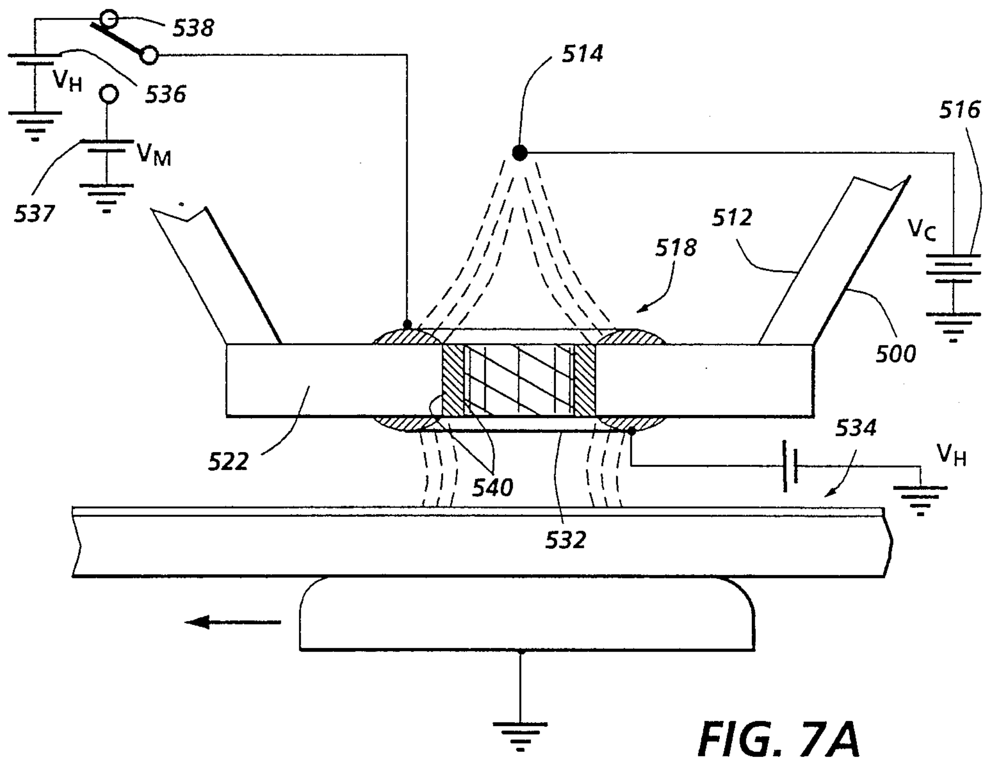
FIGS. 7A and 7B show an embodiment of the invention incorporated into an ionographic head of the type in which an ion stream is directed through an array of modulation apertures corresponding to addressable positions on the imaging surface.
Figure 7B:
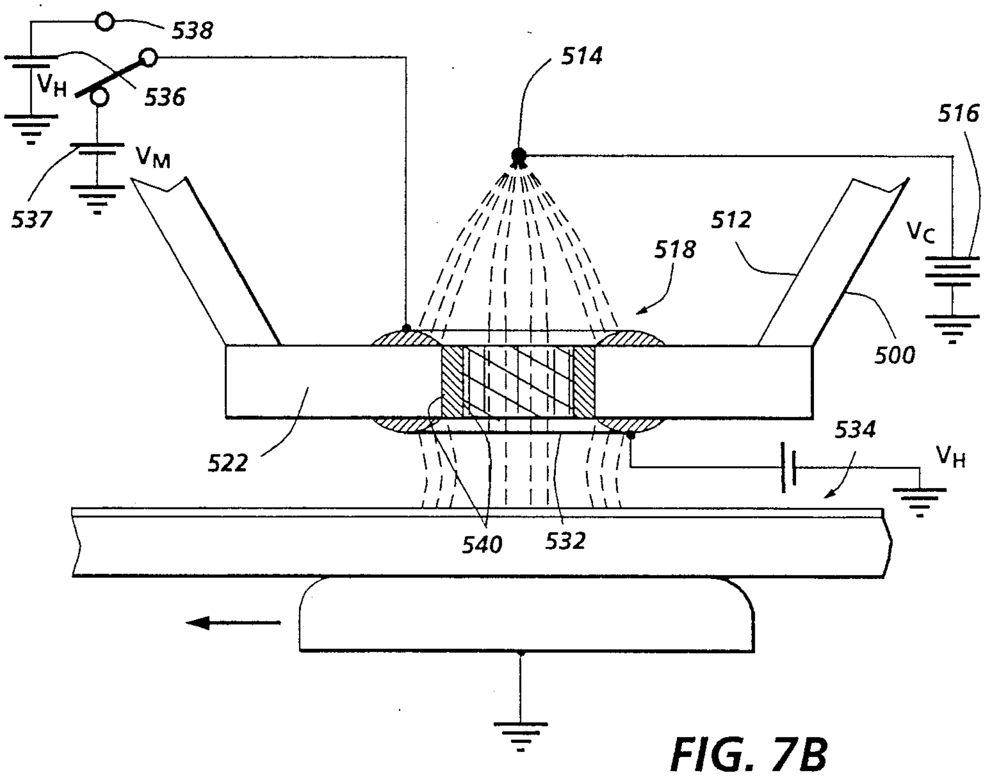

In accordance with yet another aspect of the invention as shown in FIGS. 7A and 7B, in an ionographic device which includes an imaging head 500, which may or may not be of the fluid-jet assisted type, projecting a modulated stream of ions in imagewise fashion towards a moving imaging surface 534, the head is provided with an ion chamber 512 within which is supported a coronode 514 connected to a power supply 516 and held at a voltage $V_C$ to produce ions for deposit on the imaging surface. Head 500 is provided with a generally linear array or arrays 518 of apertures 520, through an insulative head wall 522, extending from ion chamber 512 towards imaging surface 534, each aperture corresponding to an addressable position on the imaging surface, through which a stream of ions is directed for imagewise modulation. A pair of modulation electrodes 530 and 532 are associated with each aperture located on interior (chamber side) and the exterior (imaging surface side) surfaces of head wall 522. Interior electrode 530 is connected via a switch 538 to a non-marking voltage $V_H$ or a marking voltage $V_M$, respectively provided by voltage supplies 536 and 537, while the exterior electrode 532 is connected to voltage supply $V_H$. Modulation of the ion stream through aperture 520 is controlled by variations of the voltage difference between interior and exterior modulation electrodes 530 and 532 to selectively allow ions to pass through aperture 520. A resistive material layer 540 is arranged connecting modulation electrodes 530 and 532 and covering the interior surface of the aperture 520, extending co-extensively therethrough, covering the exposed surface of insulative head wall 522 within aperture 520. The electric field distribution through aperture 520 is controlled by the voltage difference applied across the resistive material layer in the ion flow direction, to shape the electric field through the aperture so that it is closely parallel to the walls forming the aperture. Ions tend to flow in the direction of the electric field, through aperture 520. As shown in FIG. 7A, when interior electrode 530 and exterior electrode 532 are held at the same voltage, the electric field does not tend to flow through modulation aperture 520, and accordingly, ions are not directed through the aperture, unless an airflow is provided. In that case, the device inefficiently loses ions to the electrode surfaces. As shown in FIG. 7A, when exterior electrode 532 is at a different potential than interior electrode 530, the electric field tends to extend through the aperture. However, in such a case, the face of the insulative head wall 522 exposed within the aperture tends to acquire a charge, which interferes with the electric field. The resistive material layer 534 alleviates this problem, because it allows the dissipation of charge deposited on the charge through resistive material layer, instead of creating a charged area, and aids in the creation of an electric field parallel to the aperture walls.

In any of the above described embodiments, it may be possible to substitute a uniform plane of resistive material for the array of resistive material electrodes. The array of electrical contacts to the modulation voltage $V_M$ and electrode reference voltage $V_R$ may remain the same. Since the predominant amount of current flow through the resistive material layer will follow the shortest path from the modulation voltage contact to the reference voltage contact, the voltage drop will tend to be at the desired location, although some crosstalk may be noted. This arrangement may have desirable manufacturing ramifications.

The invention has been described with reference to a preferred embodiment. Obviously modifications will occur to others upon reading and understanding the specification taken together with the drawings. Various alternatives, modifications, variations or improvements may be made by those skilled in the art from this teaching which are intended to be encompassed by the following claims.

I claim:

1. In an ionographic imaging device, including a body, within which is supported a source of ions, means for moving a stream of ions towards an imaging surface moving in a process direction relative to said source of ions, modulation means to modulate the ion stream in imagewise fashion for the formation of intelligible charge patterns on the imaging surface, said modulation means including a modulation channel defined by first and second surfaces, between which said stream of ions moves towards the imaging surface;

said first surface including a conductive member, electrically connected to a first potential;

said second surface, generally parallel to said first surface, supporting an array of control electrodes, each electrode including a resistive material element, electrically connected between a second potential and a switch, each said switch controllably connecting said resistive material element to either of a marking potential and a non-marking potential, disposition of said switch controlling the passage of said stream of ions therepast, whereby an electric field is produced through the modulation channel, having a direction closely parallel to the second surface, and directed towards the imaging surface.

2. The device as defined in claim 1, wherein each resistive material element is approximately coextensive with the modulation channel.

3. The device as defined in claim 1, wherein each resistive material element has a resistance in the range of about $10^6\ \Omega$ to about $10^{11}\ \Omega$ per square.

4. The device as defined in claim 1, wherein said means for moving a stream of ions towards an imaging surface includes fluid jet means for creating a fluid flow through the body and the modulation channel to entrain and carry ions produced at the ion source to said imaging surface.

5. In an ionographic imaging device, including a body forming an ion chamber having an entrance opening, an exit opening and supporting an ion source therewithin, fluid jet means for creating a fluid flow through the entrance opening into the ion chamber and out the exit opening to entrain and carry ions produced at the ion source to an imaging surface moving in a process direction, and modulation means at the exit opening to modulate the stream of ions moving therepast to the imaging surface in imagewise fashion, said modulation means including a modulation channel defined by first and second surfaces at the exit opening, between which said stream of ions and said fluid flow moves towards the imaging surface;

said first surface including a conductive member, electrically connected to a first potential;

said second surface, generally parallel to said first surface, supporting an array of control electrodes, each electrode including a resistive material element connected between a second reference potential and a switch, each said switch controllably connecting said resistive material element to either of a marking potential and a non-marking potential, disposition of said switch controlling the passage of said stream of ions past the electrode whereby, when an electric field is produced through the modulation channel, having a direction closely parallel to the second surface and the low of air through the modulation channel.

6. The device as defined in claim 5, wherein each resistive material element is approximately co-extensive with the modulation channel.

7. The device as defined in claim 5, wherein each resistive material element has a resistance in the range of about $10^6$ Ω to about $10^{11}$ Ω per square.

8. In an ionographic imaging device, including a source of ions, means for moving a stream of ions towards an imaging surface supported for relative movement in a process direction with respect to said source of ions, and modulation means to modulate the ion stream in imagewise fashion for the formation of intelligible charge patterns on the imaging surface, said modulation means including a modulation channel defined by first and second surfaces, between which said stream of ions moves towards the imaging surface, having a channel entrance and a channel exit along the path of the stream of ions therethrough, the channel exit arranged closely adjacent to the imaging surface;

said first surface having at least a single resistive material element, substantially covering said surface and electrically connected between first and second potentials, the voltage difference between said first and second potentials sufficient to assist ion flow through the channel;

said second surface, generally parallel to said first surface, supporting an array of control electrodes, each electrode including a resistive material element connected between a reference potential and a switch, each said switch controllably connecting said resistive material element between a marking potential and a non-marking potential, disposition of said switch controlling the passage of said stream of ions past the electrode, whereby, an electric field is produced through the modulation channel, having a direction closely parallel to the second surface, and directed towards the imaging surface.

9. The device as defined in claim 8, wherein each resistive material element is approximately coextensive with the modulation channel.

10. The device as defined in claim 8, wherein each resistive material element has a resistance in the range of about $10^6$ Ω to about $10^{11}$ Ω per square.

11. The device as defined in claim 8, wherein said means for moving a stream of ions towards an imaging surface includes fluid jet means for creating a fluid flow through the body and the modulation channel to entrain and carry ions produced at the ion source to said imaging surface.

12. The device as defined in claim 8, wherein said at least one resistive material element comprises an array of elements, each element connected between first and second potentials, with one of said first and second potentials switchable between said marking potential and said non-marking potental.

13. An ionographic imaging device, includin a source of ions, means for moving a stream of ions towards an imaging surface moving in a process direction relative to said source of ions, and modulation means to modulate the ion stream in imagewise fashion for the formation of intelligible charge patterns on the imaging surface, said modulation means including:

a modulation channel defined by first and second surfaces, between which said stream of ions moves towards the imaging surface, having an entrance and an exit along the path of the stream of ions therethrough, the exit arranged closely adjacent to the imaging surface;

said first and second surfaces arranged generally parallel with respect to the other, each of said surfaces supporting an array of control electrodes, each electrode including a resistive material element connected between a reference potential and a switch, each said switch controllably connecting said resistive material element to either of a marking potential and a non-marking potential, disposition of said switch controlling the passage of said stream of ions therepast.

14. The device as defined in claim 13, wherein each resistive material element is approximately coextensive with the modulation channel.

15. The device as defined in claim 13, wherein each resistive material element has a resistance in the range of about $10^6$ Ω to about $10^{11}$ Ω per square.

16. The device as defined in claim 13, wherein said means for moving a stream of ions towards an imaging surface includes fluid jet means for creating a fluid flow through the body and the modulation channel to entrain and carry ions produced at the ion source to said imaging surface.

17. The device as defined in claim 16, wherein said means for moving a stream of ions towards an imaging surface includes fluid jet means for creating a fluid flow through the body and the modulation channel to entrain and carry ions produced at the ion source to said imaging surface.

18. In an ionographic imaging device, including a body supporting a source of ions interior thereto, means for moving a stream of ions towards an imaging surface for deposit on said imaging surface moving in a process direction relative to said source of ions, and modulation means to modulate the ion stream in imagewise fashion for the formation of intelligible charge patterns on an imaging surface, said modulation means including;

an insulative wall on said body, adjacent said imaging surface, having an interior surface, generally facing said ion source, and an exterior surface, generally facing away from said ion source;

an array of modulation apertures formed in said wall, each aperture having associated therewith first and second electrodes, said first electrode located surrounding said aperture on the interior surface of said wall, and said second electrode located surrounding said aperture on the exterior surface of said wall;

a resistive material layer, connecting said first and second electrode, and covering an exposed portion of said insulative wall forming the modulation aperture;

one of said first and second electrodes electrically connected to a first potential;

the other of said first and second electrodes electrically connected to a switch, said switch controllably connecting said electrode to either of a marking potential and a non-marking potential, disposition of said switch controlling the passage of said stream of ions therepast, whereby when said switch is connected to said marking potential, an electric field is produced through the modulation channel, having a direction closely parallel to the second surface, and directed towards the imaging surface.

19. The device as defined in claim 18, wherein each resistive material element has a resistance in the range of about $10^6\ \Omega$ to about $10^{11}\ \Omega$ per square.

20. In an ionographic imaging device, including a source of ions, means for moving a stream of ions towards an imaging surface having a relative movement in a process direction with respect to said source of ions, and modulation means to modulate the ion stream in imagewise fashion for the formation of intelligible charge patterns on the imaging surface, said modulation means including a modulation channel defined by first and second surfaces, between which said stream of ions moves towards the imaging surface, having an channel entrance and a channel exit along the path of the stream of ions therethrough, the channel exit arranged closely adjacent to the imaging surface;

said first surface having at least a single resistive material element, substantially covering said surface and electrically connected between a first voltage potential and a second potential, the voltage difference between said first and second potentials being sufficient to assist ion flow through the channel;

said second surface, generally parallel to said first surface, supporting an array of conductive control electrodes, each electrode connected to a switch, each said switch controllably connecting said control electrode to either of a marking potential or a non-marking potental, disposition of said switch controlling the passage of said stream of ions past the electrode.

21. The device as defined in claim 20, wherein each resistive material element is approximately coextensive with the modulation channel.

22. The device as defined in claim 20, wherein each resistive material element has a resistance in the range of about $10^6\ \Omega$ to about $10^{11}\ \Omega$ per square.

23. The device as defined in claim 20, wherein said means for moving a stream of ions towards an imaging surface includes fluid jet means for creating a fluid flow through the body and the modulation channel to entrain and carry ions produced at the ion source to said imaging surface.

24. The device as defined in claim 20, wherein said at least one resistive material element comprises an array of elements, each element connected between first and second potentials, with one of said first and second potentials switchable between said marking potential and said non-marking potental.

* * * * *